United States Patent
Belmont

(10) Patent No.: US 7,544,238 B1
(45) Date of Patent: Jun. 9, 2009

(54) MODIFIED PIGMENTS HAVING STERIC AND AMPHIPHILIC GROUPS

(75) Inventor: James A. Belmont, Acton, MA (US)

(73) Assignee: Cabot Corporation, Boston, MA (US)

( * ) Notice: Subject to any disclaimer, the term of this patent is extended or adjusted under 35 U.S.C. 154(b) by 46 days.

(21) Appl. No.: 09/672,328

(22) Filed: Sep. 29, 2000

Related U.S. Application Data

(60) Provisional application No. 60/157,284, filed on Oct. 1, 1999.

(51) Int. Cl.
C09D 11/02 (2006.01)
C09C 1/44 (2006.01)
C08K 5/00 (2006.01)

(52) U.S. Cl. ............... 106/31.6; 106/31.75; 106/476; 106/499

(58) Field of Classification Search .............. 106/31.6, 106/31.75, 476, 499; 101/453, 450.1
See application file for complete search history.

(56) References Cited

U.S. PATENT DOCUMENTS

| | | | |
|---|---|---|---|
| 2,833,736 A | 5/1958 | Glaser ................... 260/29.6 |
| 3,607,813 A | 9/1971 | Purcell et al. ............ 260/29.6 |
| 4,104,833 A | 8/1978 | Glowacki .................. 51/281 |
| 4,692,481 A | 9/1987 | Kelly ..................... 523/219 |
| 4,770,706 A | 9/1988 | Pietsch ..................... 106/24 |
| 5,024,698 A | 6/1991 | Schwartz et al. ............ 106/20 |
| 5,026,755 A | 6/1991 | Kveglis et al. ............ 524/389 |
| 5,051,464 A | 9/1991 | Johnson et al. ............ 524/555 |
| 5,204,404 A | 4/1993 | Werner, Jr. et al. ......... 524/501 |
| 5,266,361 A | 11/1993 | Schwarte et al. ............ 427/407 |
| 5,266,406 A | 11/1993 | Den Hartog et al. ......... 428/423 |
| 5,275,900 A | 1/1994 | Ong et al. .................. 430/106 |
| 5,278,018 A | 1/1994 | Young et al. ............... 430/110 |
| 5,314,945 A | 5/1994 | Nickle et al. ............. 524/507 |
| 5,319,044 A | 6/1994 | Jung et al. ............... 526/279 |
| 5,356,973 A | 10/1994 | Taljan et al. ............. 524/314 |
| 5,484,575 A | 1/1996 | Steenackers ................ 422/176 |
| 5,493,971 A | 2/1996 | Lewis et al. ................ 101/454 |
| 5,510,221 A | 4/1996 | Matalevich et al. ...... 430/106.6 |
| 5,554,739 A | 9/1996 | Belmont .................... 534/885 |
| 5,571,311 A * | 11/1996 | Belmont et al. .......... 106/31.28 |
| 5,571,654 A | 11/1996 | Ong ........................ 430/110 |
| 5,630,868 A | 5/1997 | Belmont et al. .......... 106/31.75 |
| 5,698,016 A * | 12/1997 | Adams et al. .............. 106/31.6 |
| 5,731,115 A * | 3/1998 | Kato et al. .................... 430/49 |
| 5,895,522 A | 4/1999 | Belmont et al. ............ 106/31.6 |
| 6,336,965 B1 | 1/2002 | Johnson et al. |
| 6,432,194 B2 | 8/2002 | Johnson et al. |
| 6,478,863 B2 | 11/2002 | Johnson et al. |
| 7,056,962 B2 | 6/2006 | Johnson et al. |
| 2007/0154821 A1* | 7/2007 | Galloway et al. ............. 430/7 |

FOREIGN PATENT DOCUMENTS

| | | |
|---|---|---|
| EP | 0 685 530 A1 | 5/1995 |
| EP | 0 937 724 A1 | 2/1999 |
| WO | WO-96/18688 | 6/1996 |
| WO | WO 98/32800 | 7/1998 |

OTHER PUBLICATIONS

International Search Report for PCT/US00/026957 mailed Jan. 1, 2001.
International Preliminary Examination Report of the International Searching Authority for PCT/US00/026957 mailed Apr. 26, 2002.

* cited by examiner

Primary Examiner—Taylor Victor Oh

(57) ABSTRACT

Various modified pigment products are described which are preferably capable of being dispersed in a variety of materials such as coatings, inks, toners, films, plastics, polymers, elastomers, and the like. The modified pigments are pigments having attached a) at least one steric group and b) at least one organic ionic group and at least one amphiphilic counterion, wherein the amphiphilic counterion has a charge opposite to that of the organic ionic group.

In addition, inks, coatings, toners, films, plastics, polymers, elastomers, and the like containing the modified pigment products of the present invention are described. Methods of making the modified pigment products are also described.

25 Claims, No Drawings

MODIFIED PIGMENTS HAVING STERIC AND AMPHIPHILIC GROUPS

This application claims the benefit under 35 U.S.C. § 119 (e) of prior U.S. Provisional Application No. 60/157,284 filed Oct. 1, 1999, which is incorporated in its entirety by reference herein.

BACKGROUND OF THE INVENTION

The present invention relates to pigments which can be used in a variety of applications, and more particularly relates to the modification of pigments to improve various properties.

Pigments have been used in a variety of applications, such as in inks, coatings, toners, plastics, rubber, films, and the like. Common goals in each of these applications are to provide a pigment which is capable of being substantially and uniformly dispersed, and capable of remaining dispersed in the composition so that color and other properties exhibited by the pigment are uniform throughout the composition or material which incorporates the pigment. The improvement in the dispersibility and dispersion stability of pigments has been attempted previously and has included coating or adsorbing various surfactants onto the pigment. However, merely adsorbing or coating pigments had potentially several disadvantages. First, adsorbed surfactants are dependent on the physical properties of the surrounding materials, such as the solvent with the ink. In such a situation, an equilibrium may exist between the surface of the pigment and the solvent for surfactant affinity. Solubility issues involving the surfactant and the solvent may also come into effect. Other considerations which can effect adsorbed surfactants are the concentration of the pigment, the type of surfactants used, and the temperature and pH of the composition or material containing the pigment. Any one or more of these physical properties can cause the removal of the surfactant from the surface of the pigment and create additional surfactant in the bulk liquid or medium which may negatively effect the dispersion stability and other properties of the bulk liquid such as foaming, surface tension, viscosity, film strength, film elasticity, and the like. In addition, the excess surfactant which may be found in conventional pigments may also be detrimental to plastic or film-forming properties, such as color, strength, elongation, elasticity, and the like. Accordingly, there is a desire in the art to improve the dispersibility and dispersion stability of pigments with respect to overcoming one or more of the above-described disadvantages.

SUMMARY OF THE INVENTION

A feature of the present invention is to provide modified pigment products which are capable of improving the dispersibility and dispersion stability of the pigment in compositions and formulations.

Another feature of the present invention is to provide ink, coating, toner, polymer, paper, film, and rubber formulations which incorporate the modified pigment products of the present invention.

An additional feature of the present invention is to provide a method to improve the dispersibility and dispersion stability of pigments in various compositions and formulations.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purpose of the present invention, as embodied and broadly described herein, the present invention relates to a modified pigment product containing a pigment having attached at least one steric group and at least one organic ionic group attached to the same pigment along with at least one amphiphilic counterion, wherein the amphiphilic counterion has a charge opposite to that of the organic ionic group. A preferred steric group comprises the formula:

$$-X-Sp-[NIon]_p R \quad (I)$$

wherein X represents an arylene group or an alkylene group; Sp represents a spacer group; NIon represents at least one type of non-ionic group, R represents hydrogen, a substituted or unsubstituted aromatic group, or a substituted or unsubstituted alkyl group, and p represents an integer of from 1 to 500.

Another preferred steric group comprises the formula:

$$-X-Sp-[A]_p R \quad (II)$$

wherein X represents an arylene group or an alkylene group; Sp represents a spacer group; A represents an alkylene oxide group of from about 1 to about 12 carbons; p represents an integer of from 1 to 500, and R represents hydrogen, a substituted or unsubstituted alkyl group, or a substituted or unsubstituted aromatic group. A can be the same or different when p is greater than 1. X can be substituted or unsubstituted and can include substituted groups such as an ester group, an amide group, an ether group, a carbonyl group, an aryl group, an alkyl group, and the like. The substituted groups can be attached or linked to A.

An additional example of a steric group comprises the formula:

$$-X-Sp-[(CH_2)_m-O-]_p R \quad (III)$$

wherein X represents an arylene group or an alkylene group, Sp represents a spacer group; m represents an integer of from 1 to 12, preferably 2 or 3, p represents an integer of from 1 to 500, and R represents hydrogen, a substituted or unsubstituted alkyl group, or a substituted or unsubstituted aromatic group.

Another preferred steric group comprises at least one polymeric group, wherein the polymeric group comprises the formula:

$$-X-Sp-[polymer]R \quad (IV)$$

wherein X represents at least an arylene group or an alkylene group, Sp represents a spacer group, "polymer" represents repeating monomer or multiple monomer groups or both, optionally having at least one X' group. The total monomer repeating units is from about 1 to about 500. R represents hydrogen, a bond, a substituted or unsubstituted alkyl group, or a substituted or unsubstituted aromatic group. X' represents an aromatic group or alkyl group or an arylene group or alkylene group and each X' and X can be the same or different. X and/or X' can be substituted or unsubstituted and can include substituted groups such as an ester group, an amide group, an ether group, and the like. The substituted groups can be linked to "polymer". Also, when R represents a bond, the available bond can be attached to the pigment.

The present invention also relates to ink compositions containing at least one modified pigment product of the present invention and at least one ink vehicle.

The present invention also relates to coating compositions comprising at least one modified pigment product of the present invention and at least one coating vehicle.

The present invention also relates to toner compositions containing at least one modified pigment product of the present invention and resin particles.

Also, the present invention relates to a rubber products, polymer (e.g., plastics) products, and films containing conventional ingredients in combination with at least one modified pigment product of the present invention.

It is to be understood that both the foregoing general description and the following detailed description are exemplary and explanatory only and are intended to provide further explanation of the present invention, as claimed.

DETAILED DESCRIPTION OF THE PRESENT INVENTION

The present invention in general relates to various types of modified pigment products which are preferably capable of dispersing in a variety of materials including, but not limited to, liquids (aqueous and non-aqueous), polymers (e.g., thermoplastics and thermosets), elastomers (e.g., synthetic and/or natural rubbers), coatings (e.g., paints), inks (e.g., printing inks and inkjet inks), liquid and solid toners, films, and the like. The pigments are modified such that chemical groups (e.g., polymeric and organic) are attached onto the pigment which provides a more stable attachment of the groups onto the pigment compared to adsorbed groups, e.g., polymers, surfactants and the like.

In general, the present invention relates to a modified pigment product containing a pigment having attached at least one steric group and also attached to the pigment at least one organic ionic group along with at least one amphiphilic counterion wherein the amphiphilic counterion has a charge opposite to that of the organic ionic group. The combination of the two groups on the pigment provide beneficial properties with respect to the ability of the pigment product to disperse in a variety of materials including aqueous and non-aqueous media as well as polymers, elastomers, coatings, inks, toners, and the like. Co-pending application Ser. No. 09/285,253 filed Apr. 2, 1999 is incorporated herein in its entirety by reference.

In each of the following formulas, —X is attached directly to the pigment and —X' can be directly attached to the pigment.

With respect to the at least one steric group, generally any group that has the ability to be steric or promote steric hindrance can be attached onto the pigment. Preferred examples of the steric group attached onto the pigment are the following.

One preferred steric group comprises the formula:

wherein X represents an arylene group or an alkylene group, Sp represents a spacer group, NIon represents at least one non-ionic group, R represents hydrogen, an aromatic group, or an alkyl group, and p is an integer of from 1 to 500. Sp or the spacer group as used herein is a link between two groups and can be a bond, or a chemical group such as, but not limited to, $CO_2$, $O_2C$, $SO_2$, CO, NHCO, CONR", NR"$CO_2$, $O_2$CNR", NR"CONR", O, S, NR", $SO_2C_2H_4$, arylene, alkylene, NR"CO, NHCO$_2$, O$_2$CNH, NCHONH, and the like, wherein R", which can be the same or different, represents an organic group such as a substituted or unsubstituted aryl and/or alkyl group.

The aromatic or arylene group with respect to the X substituent and/or the R substituent can be substituted or unsubstituted and can be, for instance, an aryl or heteroaryl group. The aromatic group can be substituted with any group, such as one or more alkyl groups or aryl groups. Preferably, the aromatic group is a phenyl, naphthyl, anthracenyl, phenanthrenyl, biphenyl, pyridinyl, benzothiadiazolyl, or benzothiazolyl. Examples of the alkyl group with respect to the X substituent and/or the R substituent include, but are not limited to, substituted or unsubstituted alkyl groups which may be branched or unbranched. The alkyl group can be substituted with one or more groups, such as aromatic groups. Preferred examples of the alkyl group for purposes of the X substituent include, but are not limited to, $C_1$-$C_{12}$, like methyl, ethyl, propyl, butyl, pentyl, or hexyl groups. In other words, X and/or R can represent a branched or unbranched, substituted or unsubstituted, saturated or unsaturated hydrocarbon. Examples of substituted groups include, but are not limited to, an ester group, an amide group, an ether group, a carboxyl group, a sulfonate group, an aryl group, an alkyl group, and the like.

Examples of the non-ionic group include, but are not limited to, groups having no apparent ionic charge, such as polymers of ethylene oxide, propylene oxide, other alkylene oxides, carboxylic acid esters, glycols, alcohols, esters, alkanolamine-fatty acid condensates, silicones, ethylene glycol, propylene glycol, isocyanates, alkylpyrrolidenes, and alkylpolyglycosides. The non-ionic group, in addition to the aforementioned groups, may have carboxylates, sulfonates, phosphates, amines, and other groups that typically demonstrate an ionic nature in water. The non-ionic group is preferably a $C_1$-$C_{12}$ alkyl group, or a $C_1$-$C_{12}$ alkylene oxide group. p can be 1-25, 26-50, 51-75, 75-100, and/or 101-500, and p preferably is 5 to 50.

The X substituent and/or non-ionic group may be substituted with one or more functional groups. The functional group preferably contains a lypophilic group. Examples of functional groups include, but are not limited to, R', OR', COR', COOR', OCOR', carboxylates, halogens, CN, NR'$_2$, SO$_3$H, sulfonates, —OSO$_3$, NR'(COR'), CONR'$_2$, NO$_2$, PO$_3$H$_2$, phosphonates, phosphates, N=NR', SOR', NSO$_2$R', wherein R' which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkyoaryl, or substituted or unsubstituted arylalkyl.

Amines also represent examples of functional groups as well as quaternary ammonium groups (—NR$_3^+$) and quaternary phosphonium groups (—PR$_3^+$), as well as quaternary sulfonium groups (—SR$_2^+$).

Another preferred steric group, which can be attached onto the pigment, comprises the formula:

wherein X represents an arylene group or an alkylene group; Sp represents a spacer group; A represents an alkylene oxide group of from about 1 to about 12 carbons; p represents an integer of from 1 to 500, and R represents hydrogen, a substituted or unsubstituted alkyl group, or a substituted or unsubstituted aromatic group. A can be the same of different when p is greater than 1. X can be substituted or unsubstituted and can include substituted groups such as an ester group, an amide group, an ether group, a carbonyl group, an aryl group, an alkyl group and the like. The substituted groups can be attached or linked to A.

Examples of preferred alkylene groups include, but are not limited to, —CH$_2$—CH$_2$—O—; —CH(CH$_3$)—CH$_2$—O—; —CH$_2$CH$_2$CH$_2$—O—; —CH$_2$—CH(CH$_3$)—O—; or combinations thereof.

An additional preferred steric group comprises the formula:

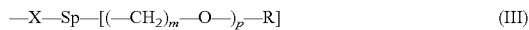
$$—X—Sp—[(—CH_2)_m—O—)_p—R] \quad (III)$$

wherein X is described above, and for instance can represent an arylene group or an alkylene group as described earlier, Sp represents a spacer group as described above, m is an integer of from 1 to 12, preferably 2 or 3, p is an integer of from 1 to 500, and R is described above, and for instance can be hydrogen, a substituted or unsubstituted alkyl group, or a substituted or unsubstituted aromatic group. Examples of R substituents include, but are not limited to, hydrogen, methyl, ethyl, butyl, or propyl groups, or —CH$_2$—CH(CH$_3$)—O—, p can be 1-25, 26-50, 51-75, 76-100, and 101-500, and is preferably 5 to 50. Particularly preferred groups of this formula are where X is a phenylene group, m is 1 to 5, and more preferably 2 or 3, p is 5 to 50, more preferably 44-45, and R is hydrogen or a methyl group. Another preferred group is where m is 2, p is 7, R is a methyl group, and X is a phenylene group.

A further preferred steric group can be at least one polymeric group. The polymeric group preferably comprises the formula:

$$—X—Sp-[polymer]R \quad (IV)$$

wherein X is described above, and for instance can represent at least an aromatic group or at least an alkyl group as described earlier, Sp represents a spacer group as described above, "polymer" comprises repeating monomer groups or multiple monomer groups or both, optionally having at least one —X' group. The 'polymer' can be substituted or unsubstituted with additional groups, and R is described above, and for instance can represent hydrogen, a bond, a substituted or unsubstituted alkyl group, or a substituted or unsubstituted aromatic group. X' represents an aromatic group or alkyl group or an arylene group or alkylene group, and each X' and X can be the same or different. The total monomer repeating units that comprise the "polymer" is not greater than about 500 monomer repeating units. X and/or X' can be substituted or unsubstituted and can include substituted groups such as an ester group, an amide group, an ether group, sulfonate, carboxylate, and the like. The substituted groups can be linked to the "polymer." Also, when R represents a bond, the available bond can be attached to the pigment. The polymeric group can be any polymeric group capable of being attached to a pigment.

For purposes of the present invention and this formula immediately above, one or more polymeric groups that comprise the "polymer" can be present. The polymeric group can be a thermoplastic polymeric group or a thermosetting polymeric group. Further, the polymeric group can be a homopolymer, copolymer, terpolymer, and/or a polymer containing any number of different repeating units. Further, the polymeric group present in the present invention can be any type of polymeric group, such as a random polymer, alternating polymer, graft polymer, block polymer, star-like polymer, and/or comb-like polymer. The polymeric group used in the present invention can also be one or more polyblends. The polymeric group can be an interpenetrating polymer network (IPN); simultaneous interpenetrating polymer network (SIN); or interpenetrating elastomeric network (IEN).

Specific examples of polymeric groups include, but are not limited to, linear-high polymers such as polyethylene, poly(vinylchloride), polyisobutylene, polystyrene, polycaprolactam (nylon), polyisoprene, and the like. Other general classes of polymeric groups of the present invention are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-inides, polymers containing olefinic double bond(s) (such as polybutadiene, polydicyclopentadiene), polyolefin copolymers, polyphenylene oxides, poly(vinyl alcohols), polyurethanes, thermoplastic elastomers, and the like.

Generally, the polymeric groups described in Volume 18 of the Encyclopedia of Chemical Technology, KIRK-OTHMER, (1982), page 328 to page 887, and Modern Plastics Encyclopedia '98, pages B-3 to B-210, and "Polymers: Structure and Properties," by C. A. Daniels, Technomic Publishing Co., Lancaster, Pa. (1989), all incorporated in their entirety herein by reference, can be used as the polymeric groups of the present invention.

The polymeric groups of the present invention can be prepared in a number of ways and such ways are known to those skilled in the art. The above referenced KIRK-OTHMER section, Modern Plastics Encyclopedia, and C. A. Daniels' reference provide methods in which these polymeric groups can be prepared.

The polymeric group is preferably a polyolefin group, a polyurethane group, a polystyrenic group, a polyacrylate group, a polyamide group, a polyester group, or mixtures thereof. Examples of R groups can be the same as previously described above. p can be 1-25, 26-50, 51-75, 76-100, 101-500, and is preferably 1 to 100, and more preferably 5 to 50.

With respect to the at least one organic ionic group attached to the pigment particle and at least one amphiphilic counterion, the organic ionic group can be attached to the pigment in varying amounts, i.e., low or high amounts, thus allowing fine control over charge modification. Preferably, the organic ionic group comprises at least one aromatic group, at least one $C_1$-$C_{20}$ alkyl group or mixtures thereof. The aromatic or alkyl groups may be further substituted with one or more ionic species, non-ionic species, or combinations thereof. In addition, the pigment particle may optionally include one or more substituted or unsubstituted non-ionic aromatic groups, substituted or unsubstituted non-ionic $C_1$-$C_{20}$ alkyl groups or combinations thereof. It is also preferred that the aromatic group or the $C_1$-$C_{20}$ alkyl group of the organic ionic group is directly attached to the pigment particles.

A preferred set of organic ionic groups attached to the pigment may be anionic or cationic in nature and include those groups described in U.S. Pat. No. 5,698,016, to Adams et al., the description of which is fully incorporated herein by reference. In addition, negatively charged organic ionic groups may be generated from groups having ionizable substituents that can form anions, such as acidic substituents or from salts of ionizable substituents. Preferably, when the ionizable substituent forms an anion, the ionizable substituent has a pKa of less than 11. The organic ionic group could further be generated from a species having ionizable groups with a pKa of less than 11 and salts of ionizable substituents having a pKa of less than 11. The pKa of the ionizable substituent refers to the pKa of the ionizable substituent as a whole, not just the acidic substituent. More preferably, the pKa is less than 10 and most preferably less than 9.

As previously mentioned above, the aromatic group may be further substituted or unsubstituted, for example, with alkyl groups. The $C_1$-$C_{20}$ alkyl group may be branched or unbranched. More preferably, the aromatic group is a phenyl or a naphthyl group and the ionizable substituents is a sulfonic acid group, a sulfinic acid group, a phosphonic acid group, or a carboxylic acid group. Representative examples of ionizable substituents include —COOH, —$SO_3H$, —$PO_3H_2$, —$SO_2NH_2$, and —$SO_2NHCOR$. Further, species, such as —COONa, —COOK, —$COO^-NR_4^+$, —$SO_3Na$, —$HPO_3Na$, —$SO_3^-NR_4^+$, and $PO_3Na_2$, where R is an alkyl or phenyl group, may also be used as a source of anionic organic ionic groups. Particularly preferred species are —COOH and —$SO_3H$ and their sodium and potassium salts. Most preferably, the organic ionic group is generated from a substituted or unsubstituted sulfophenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof.

Specific organic ionic groups are —$C_6H_4CO_2^-$, —$C_6H_4SO_3^-$, —$C_{10}H_6CO_2^-$, —$C_{10}H_6SO_3^-$, and —$C_2H_4SO_3^-$.

Positively charged organic ionic groups may be generated from protonated amines which are attached to the pigment. For example, amines may be protonated to form ammonium groups in acidic media. Preferably, an organic group having an amine substituent has a pKb of less than 5. Positively charged organic ionic group may be also be quaternary ammonium groups (—$NR_3^+$) and quaternary phosphonium groups (—$PR_3^+$). Preferably, as described above, the organic ionic group contains an aromatic group such as a phenyl or a naphthyl group and a quaternary ammonium or a quaternary phosphonium group. The aromatic group is preferably directly attached to the pigment. Quaternized cyclic ammonium ions, and quaternized aromatic ammonium ions, can also be used as the organic ionic group. Thus, N-substituted pyridinium species, such as N-methyl-pyridyl, can be used in this regard. Examples of cationic organic ionic groups include, but are not limited to, -3-$C_5H_4NH^+$, -3-$C_5H_4N$($C_2H_5$)$^+$, —$C_6H_4C_5H_5^+$, —$C_6H_4COCH_2N(CH_3)_3^+$, —$C_6H_4COCH_2(NC_5H_5)^+$, -3-$C_5H_4N(CH_3)^+$, —$C_6H_4SO_2NH(C_4H_3N_2H^+)$, —$C_6H_4CH_2N(CH_3)_3^+$, —$C_6H_4NH_3^+$, —$C_6H_4N(CH_3)H_2^+$, —$ArNH(CH_3)_2^+$, —$ArCH_2NH_3^+$, —$ArCH_2NH(CH_3)_2^+$, —$ArCH_2NH_2(CH_3)^+$, —$ArCH_2CH_2NH_3^+$, —$ArCH_2CH_2NH_2(CH)^+$, and —$ArCH_2CH_2NH(CH_3)_2^+$ in which Ar represents an aromatic group and Ar' represents an aromatic group. The aromatic group includes, but is not limited to, unsaturated cyclic hydrocarbons containing one or more rings. The aromatic group may be substituted or unsubstituted. Aromatic groups include aryl groups (for example, phenyl, naphthyl, anthracenyl, and the like), and heteroaryl groups (imidazolyl, pyrazolyl, pyridinyl, thienyl, thiazolyl, furyl, triazinyl, indolyl, and the like).

The amphiphilic counterion of the present invention is a molecule having a hydrophilic polar "head" and a hydrophobic organic "tail." The amphiphilic counterion may be cationic or anionic in nature. Representative examples of cationic and anionic amphiphilic counterions include those set forth and described in U.S. Pat. No. 5,698,016 to Adams et al., the entire description of which is incorporated herein by reference. For purposes of the present invention, the modified pigment particles, as indicated above, have a positive or negative charge. The charge preferably is created by the organic ionic group attached to the pigment. As explained earlier, if the modified pigment product is anionic, then the amphiphilic counterion will be cationic or positive charging. Similarly, if the modified pigment product is cationic, then the amphiphilic counterion will be anionic or negative charging.

Examples of cationic amphiphilic ions include, but are not limited to, those described ammonium ions that may be formed from adding acids to the following: a fatty amine, an ester of an aminoalcohol, an alkylamine, a polymer containing an amine functionality, a polyethoxylated amine, a polypropoxylated amine, a polyethoxylatedpolypropoxylatedamine, an aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine. The pKa of the ammonium ion is preferably greater than the pKa of the protonated form of the organic ionic group on the carbon.

Specific examples of cationic amphiphilic ions include dioctylammonium, oleylammonium, stearylammonium, dodecylammonium, dimethyldodecylammonium, stearylguanidinium, oleylguanidinium, soyalkylammonium, cocoalkylammonium, oleylammoniumethoxylate, protonated diethanolaminedimrystate, and N-oleyldimethylammonium. Cationic amphiphilic ions include, ditallowalkylammonium, dimethyloleylammonium, cocoalkyldimethylammonium, and dimethylhydrogenatedtalloalkylammonium. Cationic amphiphilic ions also include dicocoalkylammonium and dicyclohexylammonium. Generally, to form the ammonium ions described above, the various compounds described above such as fatty amines, esters of amino alcohols, etc., are reacted with an acid such as carboxylic acid, a mineral acid, an alkyl sulfonic acid, or an aryl sulfonic acid. Preferred amphilphilic groups include ammonium ethoxylates, ammonium propoxylates ammonium ethoxylatepropoxylates. They may be prepared from the corresponding amino ethoxylates and the like, including Jeffamine materials supplied by Huntsman Chemical and aminoalkylarylpropoxylates supplied by Triquest. Other preferred amphiphilic groups include $H_3N^+Ar$—$Sp[NIon]_p$ R, $H_3N^+[A]R$, $H_3N^+$—$Sp[NIon]_pR$, and the like and particularly preferred groups include $H_3N^+C_6H_4CO_2[NIon]_pR$ and $H_3N^+C_6H_4NHCO_2[NIon]_pR$. Further examples of amphiphilic counterion groups include amino terminated versions of formulas I through IV, (e.g., —$NH_3$—X—Sp—[NIon]$_p$R and the like.

Quaternary ammonium salts can also be used as the sources of the cationic amphiphilic ion. Examples include, but are not limited to, a fatty alkyl trimethyl ammonium, a di(fatty alkyl)dimethylammonium, an alkyl trimethyl ammonium, or 1-alkyl pyridinium salt, where the counterion is a halide, methosulfate, sulfonate, a sulfate or the like. Also, phosphonium salts, such as tetraphenylphosphonium chloride can be used as the sources of the amphiphilic ion.

Cationic amphiphilic ions for use in the present invention include those represented by the formula $R_4N^+$, wherein R is independently hydrogen, $C_1$-$C_{30}$ alkyl $C_1$-$C_{30}$ alkenyl, $C_7$-$C_{30}$ aralkyl, and $C_7$-$C_{30}$ alkaryl. The cationic amphiphilic ions can have on average at least 16 carbons such as with cocoalkyltrimethylammonium, tallowalkyltrimethylammonium, hydrogenatedtallowalkyltrimethylammonium, soyalkyltrimethylammonium, benzylcocoalkyldimethylammonium and hexadecyltrimethylammonium. The cationic amphiphilic ions can have at least 24 carbons such as with dicocoalkyldimethylammonium, dimethyldioctadecylammonium, dimethyl(2-ethylhexyl)hydrogenatedtallowalkylammonium, and dimethylditallowammonium.

Another example of a suitable amphiphilic ion is a polymer containing an ammonium ion derived from an amine containing polymer. The amine containing polymer can be a copolymer of an amine containing monomer, such as dimethylaminoethyl methacrylate or -acrylate, or vinylpyridine or vinylimidazole, and another monomer such as methyl acrylate, methyl methacrylate, butyl acrylate, styrene, and the like. The polymer may also be a ter- or tetra-polymer containing a mixture of an amine containing monomer and two or three other amine containing monomers, respectively. Such a polymer may be prepared by any means, such as radical (emulsion, suspension, or solution) or anionic polymerization.

As stated earlier, the amphiphilic ion can alternatively be an anionic amphiphilic ion. Examples of such anionic amphiphilic ions include, but are not limited to, an alkylbenzene sulfonate, an alkyl sulfonate, an alkylsulfate, a sulfosuccinate, a sarcosine, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, an aliphatic carboxylate, or an ion derived from a polymer containing an acid group. Sources of specific and preferred examples of anionic amphiphilic ions include, but are not limited to, sodium dodecylbenzene sulfonate, a sodium dodecylsulfate, Aerosol OT, an oleic acid salt, a ricinoleic acid salt, a myrisitic acid salt, a caproic acid salt, sodium 2-octyldodecanoate, sodium bis(2-ethylhexyl)sulfosuccinate, a sulfonated polystyrene, or homo- or copolymers of acrylic acid or methacrylic acid or salts thereof.

Generally, the above-identified amphiphilic ions and related compounds are commercially available in salt form or can be routinely made by one of ordinary skill in the art.

The pigment to be modified can be, but is not limited to, pigments traditionally used in ink compositions (including inkjet ink compositions), coating compositions (including paint formulations), liquid and solid toners, films, plastics, rubbers, and the like.

Examples include, but are not limited to, black pigments (e.g., carbon products like carbon black) and other colored pigments (e.g., polymeric and organic pigments).

The desired colored pigment may be chosen from a wide range of conventional colored pigments. The colored pigment can be blue, black, white, brown, cyan, green, violet, magenta, red, yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation. Examples of other suitable colored pigments are described in the *Colour Index*, 3rd edition (The Society of Dyers and Colourists, 1982). Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation. The colored pigment will typically have a wide range of BET surface areas, as measured by nitrogen adsorption. Preferably, the colored pigment has a surface area equal or greater than 10 $m^2/g$, and more preferably equal or greater than and 100 $m^2/g$, thereby corresponding to a smaller primary/aggregate particle size. Such surface areas have been found to provide for a more uniform distribution and efficient level of treating agent on the surface of the pigment and a higher percent yield of the surface-modified colored pigment after post processing techniques. If the preferred higher surface area of the colored pigment (thereby corresponding to a smaller particle size) is not readily available, it is well recognized by those skilled in the art that the colored pigment may be subject to conventional size comminution or reduction techniques, such as ball or jet milling, to reduce the pigment to the desired particle size.

Carbon product as used herein, is preferably capable of reacting with a diazonium salt to form the above-mentioned modified carbon product. The carbon may be of the crystalline or amorphous type. Examples include, but are not limited to, graphite, carbon black, vitreous carbon, carbon fibers, activated charcoal, and activated carbon. Finely divided forms of the above are preferred; also, it is possible to utilize mixtures of different carbons. Any surface area can be used.

For purposes of the present invention, one or more types of steric groups and/or organic ionic groups and/or other types of chemical groups can be attached to the same and/or different pigments.

To prepare the above modified pigment products, the diazonium salt need only be sufficiently stable to allow reaction with the pigment. Thus, that reaction can be carried out with some diazonium salts otherwise considered to be unstable and subject to decomposition. Some decomposition processes may compete with the reaction between the pigment and the diazonium salt and may reduce the total number of groups attached to the pigment. The modified pigment products may be prepared by reacting the pigment as defined above with a diazonium salt in a liquid reaction medium to attach at least one group to the surface of the pigment. Preferred reaction media include water, any medium containing water, and any medium containing alcohol. Water is the most preferred medium. Further, the reaction may be carried out at elevated temperatures where many diazonium salts may be susceptible to decomposition. Elevated temperatures may also advantageously increase the solubility of the diazonium salt in the reaction medium and improve its handling during the process. The pigment can be reacted with a diazonium salt when present as a dilute, easily stirred, aqueous slurry, or as a more concentrated highly mixed slurry in water.

A preferred method of preparing the modified pigment products involves reducing the pigments to be modified to a size desirable for the particular end use application. If, of course, the pigment is already of an appropriate size, then no reduction in size is necessary. Generally, the size of the pigment can be the same size as the pigment sizes used conventionally for the particular end use applications. For instance, the average particle size of the pigment can be about 10 microns or less, and preferably about 5 microns or less. Preferably, for instance, in inkjet ink applications, the average pigment particle size is preferably less than about 1 micron and more preferably less than about 0.5 micron (e.g., a preferred range is about 0.01 micron to less than about 1 micron), and is preferably less than about 10 microns for coatings, toner, polymer, and rubber applications. If size reduction of the pigment to be modified is preferred, any method of reducing size can be used such as those described in T. C. Patton, "Paint Flow and Pigment Dispersion," 2nd ed., Wiley, NY (1979), incorporated herein by reference.

To attach a group having one or more of the formulas described above, a surfactant or polymer may be introduced to or contacted with the pigments. The surfactant or polymer comprises an organic group or polymeric group having at least one primary amine. A sufficient amount of time is provided to preferably adsorb the surfactant or polymer onto the pigment. Preferably, after adsorption occurs, a diazonium reaction can be conducted as described in U.S. Pat. Nos. 5,571,311 and 5,630,868, as well as 5,554,739 and PCT Publication WO-96/18688, all incorporated herein in their entirety by reference. In more detail, the preferred means of attaching the surfactant or polymer onto the pigments is by grinding, or reducing in size by other suitable mechanical or chemical means, the pigment in the presence of a solvent (e.g., aqueous or non-aqueous), preferably water, or homogeneous or heterogeneous mixtures of solvents with water. The surfactant or polymer can also be present during this size reduction step. Alternatively, the surfactant or polymer may be added after the size reduction step. An aqueous solution of a nitrite and an acid are then added separately or together to generate the diazonium reaction and form the diazonium salt which reacts with the pigment. This generation of the diazonium salt is preferably accomplished in situ with the pigment.

The surfactant or polymer is preferably any group capable of attaching onto a pigment through a diazonium reaction. In more detail, the surfactant or polymer will typically have a primary amine group attached to polymeric groups or organic groups, like aromatic or alkyl groups (e.g., the X substituent) set forth in the formulas above. In the diazonium reaction, the primary amine group will react to form nitrogen gas or other by-products which will then permit the group, for instance the aromatic group or alkyl group, to attach onto the pigment.

Typically known surfactants or polymers may be modified to comprise a primary amine using known techniques to those skilled in the art, such as esterification involving a nitro aromatic or nitro alkyl group and the surfactant or polymer and the subsequent reduction of nitro groups on the aromatic or alkyl group to the corresponding primary amine groups. Nitration of the surfactant or polymer followed by reduction, or amination of the surfactant or polymer are some other techniques that may be used. Surfactants are commercially available under various well-known trademarks, such as the PLURONIC® series (BASF Corporation, Parsippany, N.J.), the TETRONIC® series (BASF Corporation, Parsippany, N.J.), the ARQUAD® series (Akzo Chemical Inc., Chicago, Ill.), the TRITON® series (Union Carbide Corp., Danbury, Conn.), the SURFONIC® series (Texaco Chemical Company, Houston, Tex.), the ETHOQUAD® series (Akzo Chemical Inc., Chicago, Ill.), the ARMEEN® series (Akzo Chemical Inc., Chicago, Ill.), the ICONOL® series (BASF Corporation, Parsippany, N.J.), the SURFYNOL® series (Air Products and Chemicals, Inc. Allentown, Pa.), and the ETHOMEEN® series (Akzo Chemical Inc., Chicago, Ill.), to name a few.

Other suitable surfactants for use in the present invention are disclosed in, for example, Kirk-Othmer, *Encyclopedia of Chemical Technology*, 3rd edition, Vol. 22 pages 332-386 and available manufacturing literature, including for example McCutcheon's *Emulsifiers & Detergents, North American and International Edition* (McCutcheon Division, The MC Publishing Co., 1991); Ash, *The Condensed Encyclopedia of Surfactants* (Chemical Publishing Co., Inc. 1989); and, Ash, *What Every Chemical Technologist Wants to Know About . . . . Emulsifiers and Wetting Agents*, Volume I (Chemical Publishing Co., Inc. 1988), all of which are incorporated herein by reference.

For purposes of the invention, one or more surfactants, as described above, may be present. In addition, one or more surfactants can be combined with one or more polymeric groups as described above.

The organic ionic group with amphiphilic part of the modified pigment particle may be prepared by the reaction of the modified pigment particle having an organic ionic group, with the salt of an amphiphile. For instance, an aqueous dispersion of an anionically modified carbon black can be combined with an amine containing compound and one or more equivalents of an acid; or can be combined with a quaternary ammonium salt; or can be combined with an amine containing polymer and one or more equivalents of an acid. Alternatively, a cationically modified carbon black can be combined with an anionic amphiphile. The resulting products, whether anionic or cationic in nature, may be purified by washing, such as by filtration, to remove unreacted raw materials, byproduct salts and other reaction impurities. The products can also be isolated, for example, by evaporation or it may be recovered by filtration and drying using known techniques to those skilled in the art.

Alternatively, an aqueous dispersion of the modified carbon black or pigment particle, as its free acid, may be combined with an amine containing amphiphile. In this way the modified carbon product protonates the amine, thus forming ions from each of the two components. The complimentary case may be useful for a modified carbon black bearing a free base with an acidic amphiphilic compound.

In addition, the modified carbon black or pigment particle having attached ionic groups may further be prepared using known techniques to those skill in the art, such as by adding the modified carbon black or pigment particle to a continuously operating pin mixer with an amphiphilic ion of the opposite charge in an aqueous solution. Alternatively, the carbon black or pigment particle, the reagents for attaching the organic ionic group to the carbon black or pigment particle, and an amphiphilic ion source may be added simultaneously in a suitable batch or continuous mixer. The resultant material is optionally purified and subsequently dried for use in such applications as toner and developer applications.

The steric group may be attached before or after the ionic group is attached to the pigment and the steric group may be attached before or after the amphiphilic ion is added. The amount of the amphiphilic ion that is present in the composition of the modified pigment particle is generally introduced in an amount should be sufficient to neutralize at least a portion of the charged groups on the pigment surface, for example a carbon black or similar product. It is preferred to neutralize about 75% or more of the charged groups on the pigment surface. Flocculation may or may not occur during neutralization.

The level of treatment of the various groups attached on the pigment can be any amount and preferably is from about 0.01 to about 50 micromoles/m$^2$, and more preferably is from about 0.10 to about 5 micromoles/m$^2$.

The modified pigment particles can then be subsequently subjected to cleaning procedures (e.g., washing or precipitation) which will remove substantially any excess reactants and unattached dispersants. The remaining slurry containing the modified pigment products can then be added to either aqueous or non-aqueous media and preferably with little or mild agitation to form stable (electrostatic, steric, and/or electrosteric) dispersions for a variety of end uses as described above.

The pigment products may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the pigments of the present invention may be further purified or classified to remove impurities and other undesirable free species which can co-exist in the dispersion as a result of the manufacturing process. In a preferred embodiment, the pigment dispersions are subject to a classification step, such as centrifugation, to substantially remove particles having a size above about 1.0 micron, preferably above about 0.5 micron. In addition, the dispersion is preferably purified to remove any undesired free species, such as unreacted treating agent. Known techniques of ultrafiltration/diafiltration using a membrane or ion exchange may be used to purify the dispersion and remove a substantial amount of free ionic and unwanted species. Also preferred is an optional exchange of counterions whereby the counterions that form a part of the surface-modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, carboxylate, and $Br^-$. Such additional classification and purification methods are more fully described in U.S. patent application Ser. No. 09/240,291, filed Jan. 29, 1999, the disclosure of which is fully incorporated herein by reference.

Uses of the Modified Pigment Products

The modified pigment products of this invention may be used in the same applications as conventional pigments, like carbon blacks. The groups attached to the pigment, however, can be used to modify and improve the properties of a given pigment for a particular use.

Modified pigment products according to the invention can be used in a number of end use applications. These uses include, for example, plastic compositions, aqueous and non-aqueous inks, aqueous and non-aqueous coatings, rubber compositions, toner compositions, paper products, and textile and fiber compositions. The following paragraphs describe these uses generally and examples of each are shown below.

The modified pigment products of this invention can be used as colorants in a plastic material. The modified pigment products of the invention can also be used to impart conductivity to a plastic material. The modified pigment products of the invention may give an increased rate of dispersion or improved quality of dispersion over the corresponding untreated pigment. These improvements offer an economic advantage in plastic manufacture and in value of the finished product, respectively. Using the modified pigment products of the invention may improve impact strength of the plastic. Thus, the invention relates to an improved plastic composition comprising a plastic and the modified pigment product.

As with conventional pigments, the modified pigment products can be used with a variety of plastics, including but not limited to plastics made from thermoplastic resins, thermosetting resins, or engineered materials, for example, composites. Typical kinds of thermoplastic resins include: (1) acrylonitrile-butadiene-styrene (ABS) resins; (2) acetals; (3) acrylics; (4) cellulosics; (5) chlorinated polyethers; (6) fluorocarbons, such as polytetrafluoroethylene (TFE), polychlorotrifluoroethylene (CTFE), and fluorinated ethylene propylene (FEP); (7) nylons (polyamides); (8) polycarbonates; (9) polyethylenes (including copolymers); (10) polypropylenes (including copolymers); (11) polystyrenes; (12) vinyls (polyvinyl chloride); (13) thermoplastic polyesters, such as polyethylene terephthalate or polybutylene terephthalate; (14) polyphenylene ether alloys; and blends and alloys of the above with rubber modifiers. Typical thermosetting resins include: (1) alkyds; (2) allylics; (3) the aminos (melamine and urea); (4) epoxies; (5) phenolics; (6) polyesters; (7) silicones; and (8) urethanes.

Generally, the modified pigment product is added like any other pigment to the plastic used to form a plastic premix. This can be done, for example, in a dry mix or a melt stage. The modified pigment product may also be incorporated on or in a plastic by adding it to a solvent, where the plastic is soluble or partially-soluble, followed by removal of the solvent (e.g., by evaporation). The modified pigment products of the invention may be used in combination with other conventional additives in plastic compositions. According to the invention, the term plastic composition includes, but is not limited to, any plastic material, article, goods, surface, fabric, sheet, film, and the like. For example, plastic materials include automotive parts, siding for homes, liners for swimming pools, roofing materials, packaging materials, synthetic fibers, food, and storage containers, light absorbing applications (e.g., bar codes), and any variety of other household or industrial items.

The modified pigment products of this invention are also useful in aqueous and non-aqueous ink formulations. Thus, the invention provides an ink composition comprising an ink vehicle and a modified pigment product. Other known ink additives may be incorporated into the ink formulation. Typical inks include, but are not limited to: lithographic, letterpress, flexographic, gravure, screening, phase change ink jet inks, and ink jet applications.

In general, an ink consists of four basic components: (1) a colorant, (2) a vehicle or varnish which functions as a carrier during printing, (3) additives to improve printability, drying, and the like, and (4) solvents to adjust viscosity, drying and the compatibility of the other ink components. For a general discussion of the properties, preparation and uses of inks, see The Printing Manual, 5th Ed., Leach et al, Eds. (Chapman and Hall, 1993) incorporated herein by reference. Various ink compositions are also disclosed, for example, in U.S. Pat. Nos. 2,833,736; 3,607,813; 4,104,833; 4,770,706; and 5,026,755, incorporated in their entirety herein by reference. Also, any conventional amounts of the pigment used in the desired application can be present in compositions of the present invention. Preferably, with respect to an ink composition, for instance, the pigment can be present in an amount of from 1 wt % to about 25 wt % or higher, and more preferably from about 3 wt % to about 10 wt %, based on the weight of the ink composition.

The modified pigment products of the invention, either as predispersion or as a solid, can be incorporated into an ink formulation using standard techniques. Use of a water dispersible or solvent-dispersible modified pigment product of the invention can provide a significant advantage and cost savings by reducing or eliminating the milling steps generally used with other conventional pigments.

Flexographic inks represent a group of ink compositions. Flexographic inks generally include a colorant, a binder, and a solvent. The modified pigment products of the invention are useful as flexographic ink colorants.

The modified pigment products of the invention can be used in news inks. For example, a news ink composition may comprise an ink vehicle (e.g., water), the modified pigment products of the invention, a resin, and optional conventional additives such as antifoam additives or a surfactant.

The modified pigment products of the invention may also be used in phase change (hot melt) inks. Phase change inks generally include at least one colorant and at least one phase change or wax carrier (e.g., a fatty amide-containing material like a mixture of a tetra amide compound and a mono-amide compound, or an alkanolamides and polyethylene glycol mixture). The phase change ink is in a solid phase at ambient temperature and in a liquid phase at an elevated operating temperature of the printer. When the ink is heated it melts to form a low viscosity fluid that can be ejected as droplets. Upon jetting, heated droplets impact on a substrate, and cool to ambient temperature forming films of uniform thickness. Subsequent impaction of the droplets on the substrate may also occur, depending upon the type of printer used. Use of a modified pigment product can provide a significant advantage in dispersion stability and carrier compatibility over conventional pigments and in light-fastness over dyes.

The modified pigments of the present invention can also be used in lithographic or flexographic printing. For example, the ink or fountain solution used in the printing process can contain the modified pigments of the present invention.

The modified pigments of the present invention can also be used in the manufacture of lithographic printing plates, flexographic printing plates, gravure cylinders, thermal transfer recording materials, proofing materials for printing.

The modified pigments of the present invention can also be used in the manufacture of lithographic printing plates, such as infrared or near-infrared laser-imageable printing plates.

Typically, imaging occurs when the plate is exposed to radiation having wavelengths of between 800 and 1200 nm. Generally, an infrared or near-infrared laser-imageable lithographic printing plate includes at least the following layers: a grained-metal, polyester or paper plate or sheet-like substrate and a radiation-absorptive layer coated thereon. Protective layers for the substrate or the surface of the coated plate may also be used in the present invention. When coated onto the substrate, the protective layer can also serve as an adhesion-promoting primer. Other layers may be used, for example, to improve adhesion between layers and durability of the printing plate. The radiation-absorptive layer contains the modified pigment of the present invention along with other conventional ingredients, such as resins and binders. In the imaging process, a lithographic printing plate is selectively exposed to a laser output or other source capable of removing or chemically modifying the radiation-absorbent layer or layers adjacent thereto. The laser output will define a pattern on the printing plate and remove or modify only those portions of the radiation-absorptive layer which define the pattern. Afterwards, the printing plate can be further developed by subjecting it to a solvent capable of removing the imaged layer(s), if any remains, which defines the same pattern. The details of the various conventional components and techniques for such printing plates are described in U.S. Pat. No. 5,493,971; EP 0 803 771 A1; EP 0 770 494 A2; EP 0 770495 A1; as well as PCT Publications WO-98/31550; WO-99/37481; WO-99/37482 and the patents and publications referenced therein.

The modified pigments of the present invention can also be used in the manufacture of flexographic printing plates, such as infrared or near-infrared laser-imageable printing plates. Typically, imaging occurs when the plate is exposed to radiation having wavelengths of between 800 and 1200 nm. Generally, an infrared or near-infrared laser-imageable flexographic printing plate includes at least the following layers: a polyester plate or sheet-like substrate, a UV curable layer, and a radiation-absorptive layer coated thereon. Protective layers for the substrate or the surface of the coated plate may also be used in the present invention. Other layers may be used, for example, to improve adhesion between layers and durability of the printing plate. The radiation-absorptive layer contains the modified pigment of the present invention along with other conventional ingredients, such as resins and binders. In the imaging process, a gravure or flexographic printing plate is selectively exposed to a laser output or other source capable of removing or chemically modifying the radiation-absorbent layer or layers adjacent thereto. The laser output will define a pattern on the printing plate and remove or modify only those portions of the radiation-absorptive layer which define the pattern. The plate may be subsequently exposed to UV energy. Afterwards, the printing plate can be further developed by subjecting it to a solvent capable of removing the nonexposed layer(s), if any remains, which defines the same pattern. The details of the various conventional components and techniques for such printing plates are described in European patent application EP 0928685 A2, which is incorporated in its entirety by reference herein.

The modified pigments of the present invention can also be used in the manufacture of thermal transfer recording materials. Generally, a thermal transfer recording material includes an ink layer, a photothermal layer, and a support. Protective layers for the substrate or the surface of the coated plate may also be used in the present invention. Other layers may be used, for example, to improve adhesion between layers of the recording material or to provide a cushion between layers. The photothermal layer contains the modified pigment of the present invention along with other conventional ingredients, such as resins and binders. In the imaging process, the recording material may be exposed by a laser through the support while the thermal transfer recording material is in contact with a receiving material. The laser output will define a pattern on the recording material and cause an image to be transferred to the receiving material. The details of the various conventional components and techniques for such photothermal recording materials are described in Japanese patent JP10016395A, which is incorporated in its entirety by reference herein. These thermal transfer recording materials may also be used for color proofing in printing systems or they may be used in medical diagnostic systems.

The modified pigments of the present invention can also be used in the manufacture of other types of proofing materials. Generally, these proofing materials include at least the following layers: a radiation transparent support, a radiation curable layer, and a receiving layer. Protective layers for the substrate or the surface of the coated plate may also be used in the present invention. Other layers may be used, for example, to improve durability and adhesion between layers of the printing plate. The radiation-curable layer contains the modified pigment of the present invention along with other conventional ingredients, such as resins and binders. In the imaging process, the proofing material is selectively exposed, through the support, to a laser output or other source capable of causing the curing of the radiation curable layer. The laser output will define a pattern on the printing plate and cure only those portions of the radiation curable layer which define the pattern. Subsequently, the support is removed. The cured image may adhere to the receiving layer and the uncured portions of the radiation curable layer are removed with the support. The details of the various conventional components and techniques for such printing plates are described in European patent application EP924568 which is incorporated in its entirety by reference herein.

The modified pigment products of the invention may also be used in coating compositions such as paints or finishes, or the like. Thus, an embodiment of the invention is a coating composition comprising an aqueous or non-aqueous vehicle, resin or binder, and a modified pigment product. Other known coating additives may be incorporated in the coating compositions. See, for examples, McGraw-Hill Encyclopedia of Science & Technology, 5th Ed. (McGraw-Hill, 1982), incorporated herein by reference. See also U.S. Pat. Nos. 5,051,464; 5,319,044; 5,204,404; 5,051,464; 4,692,481; 5,356,973; 5,314,945; 5,266,406; and 5,266,361, incorporated in their entirety by reference herein.

The modified pigment products of the invention, either as a predispersion or as a solid, can be incorporated into a coating composition using standard techniques. Use of a water or solvent dispersible modified pigment product provides a significant advantage and cost savings by reducing or eliminating the milling steps generally used with other conventional pigments.

The modified pigments of the present invention can also be used in the manufacture of a black matrix for color filters. A black matrix is generally formed by applying a photosensitive coating on a clear substrate, exposing the coating imagewise, developing and drying the coating. The coating contains the modified pigment of the present invention as well as other conventional ingredients, such as photosensitive resins and solvents. The color filter further comprises colored layers. The color layers may be, for example, red, green and yellow, or cyan, magenta and yellow. The details of the various conventional components and techniques for such black matrices are described in Japanese patents JP11062119; JP10300921; JP11006914; JP 11014822 JP 11142639 which are incorporated in their entirety by reference herein.

The modified pigment products of the invention may also be used in paper compositions. Accordingly, the invention relates to a paper product comprising paper pulp and at least one modified pigment product.

The modified pigment products of the invention, either as a solid or a predispersion, can be incorporated into paper pulp using standard papermaking techniques as with conventional pigments. Use of a water or solvent dispersible modified pigment product discussed above may provide a significant advantage and cost savings by reducing or eliminating the steps generally used to disperse other conventional pigments.

The paper products of the invention may incorporate other known paper additives such as sizing agents, retention aids, fixatives, fillers, defoamers, deflocculating agents, and the like. Advantageously, the water or solvent dispersible modified pigment products discussed above are retained more efficiently at low loading levels when compared to the untreated pigments when retention aids and acidic or alkaline sizing agents are used.

The modified pigment products of the invention may also be used, as with conventional pigments, as pigments, fillers, and reinforcing agents in the compounding and preparation of rubber compositions. Accordingly, the invention relates to a rubber or elastomeric composition containing at least one rubber or elastomer and at least one modified pigment.

Carbon blacks, for example, are useful in the preparation of rubber vulcanizates such as those in tires. It is generally desirable in the production of tires to utilize carbon blacks which produce tires with satisfactory abrasion resistance and hysteresis performance. The treadwear properties of a tire are related to abrasion resistance. The greater the abrasion resistance, the greater the number of miles the tire will last without wearing out. The hysteresis of a rubber compound means the difference between the energy applied to deform a rubber compound, and the energy released as the rubber compound recovers to its initial undeformed states. Tires with lower hysteresis values reduce rolling resistance and therefore are able to reduce the fuel consumption of the vehicle utilizing the tire. Thus, it is particularly desirable to have carbon black products capable of imparting greater abrasion resistance and lower hysteresis in tires.

The modified pigment products, and preferably the modified carbon black products of this invention are useful in both natural and synthetic rubber compositions or mixtures of natural and synthetic rubbers. Carbon black products comprising an aromatic sulfides group are preferred for this use. The carbon black products of the invention can be used in rubber compositions which are sulfur-cured or peroxide-cured.

The modified pigment products may be mixed with natural or synthetic rubbers by normal means, for examples by milling. Generally, amounts of the modified pigment product ranging from about 10 to about 250 parts by weight can be used for each 100 parts by weight of rubber in order to impart a significant degree of reinforcement. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Rubbers suitable for use with the present invention are natural rubber and its derivatives such as chlorinated rubber. The modified pigment products of the invention may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2-vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber composition of the present invention can therefore contain at least one elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between –120° C. and 0° C. Examples of such elastomers include poly(butadiene), poly(styrene-co-butadiene), and poly(isoprene).

Advantageously, the modified pigment products, and especially the modified carbon black products of the present invention can impart improved abrasion resistance and/or reduced hysteresis to rubber or elastomeric compositions containing them.

The modified pigment products of this invention may also be used to color fibers or textiles. Preferred modified pigment products for this use are the dispersible modified pigment products. Accordingly, the invention relates to fiber and textile compositions comprising a fiber or textile and a modified pigment product. Fibers suitable for use comprise natural and synthetic fibers such as cotton, wool, silk, linen, polyester and nylon. Textiles suitable for use comprise natural and synthetic fibers such as cotton, wool, silk, linen, polyester and nylon. Preferably natural fibers and textiles comprising cotton, wool, silk, and linen are used.

The modified pigment products of the present invention may be colored by means known in the art to color fibers and textiles with, for example, direct and acid dyes. Also, the modified pigments can be incorporated into fibers by spinning techniques, such as wet spinning, dry spinning, and melt spun techniques. For a general discussion of coloring with dyes, see Kirk-Othmer Encyclopedia of Chemical Technology, Vol. 8 pp 280-350 "Dyes, Application and Evaluation" (John Wiles and Sons, 1979), incorporated herein by reference. Use of a water or solvent dispersible modified pigment product discussed above provides a method for coloring these materials with a lightfast colorant.

The present invention also relates to toner compositions comprising toner resin particles and the modified pigment particles of the present invention. Conventional additives as described in U.S. Pat. Nos. 5,278,018; 5,510,221; 5,275,900; 5,571,654; and 5,484,575; and EP 0 270-066A1 can be used and these patents are incorporated herein by reference.

The present invention also relates to an inkjet ink composition comprising an aqueous or non-aqueous vehicle and a modified pigment product. In contrast to conventional pigments, the modified pigment products for use in the inkjet ink of the present invention are not difficult to disperse in an aqueous or non-aqueous vehicle. The modified pigment products do not necessarily require a conventional milling process, nor are additional dispersants necessarily needed to attain a usable ink. Preferably, the modified pigment products only require low shear stirring or mixing to readily disperse the pigment in water or other solvent.

Formation of an inkjet ink containing a vehicle and stably dispersed modified pigment product as pigment can be preformed with a minimum of components and processing steps when the above modified pigment products are utilized. Such an ink may be used in any inkjet printer known in the art. Preferably, in inkjet inks of the present invention, the modified pigment products are present in an amount of less than or equal to 20%-25% by weight of the inkjet ink. It is also within the bounds of the present invention to use an inkjet ink formulation containing a mixture of unmodified pigment with the modified pigment products of the present invention. Common additives such as those discussed below may be added to the dispersion to further improve the properties of the inkjet ink.

In particular, a humectant may be added to reduce the rate of evaporation of water in the ink to minimize clogging. If the ink begins to dry out, the humectant concentration increases and evaporation decreases further. Humectants may also affect other properties of the ink and prints made therefrom, such as viscosity, pH, surface tension, optical density, and print quality. Preferred humectants include ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellosolve, ether derivatives, amino alcohols, and ketones.

Biocides such as benzoate or sorbate salts are important in preventing bacterial growth. Bacteria are often larger than ink nozzles and can cause clogging and other problems. Binders attach to the substrate to hold the colorant on the paper. Examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof. Drying accelerating agents promote evaporation of the ink once the ink is placed in the paper. These include sodium lauryl sulfate, N,N-diethyl-m-toluamide, cyclohexylpyrrolidinone, and butyl carbitol. Penetrants such as alcohols, sodium lauryl sulfate, esters, and ketones allow the ink to penetrate the surface of the paper. Alcohols may also be used to increase the rate of drying of the liquid ink, and surfactants like detergents and soap reduce the surface tension to allow the ink to spread on the substrate.

Additionally, the modified pigment products-based inkjet inks may incorporate some dye to modify color balance and adjust optical density. Such dyes include food dyes, FD & C dyes, derivatives of phathalocyanine tetrasulfonic acids, including copper phthalocyanine derivates, tetra sodium salts, tetra ammonium salts, tetra potassium salts, tetra lithium salts, and the like.

Polymers or oligomers may be added to inkjet inks based on the modified pigment products. The images created from such an ink may be water-insoluble upon polymerization or cross-linking of the added polymers or oligomers.

Additionally, in preparing inkjet inks utilizing the modified pigment products of the present invention, sequential filtration of the inks through filters of descending size or centrifugation or both may be used to obtain a more desirable final product. For instance, filtering first with a 3.0 micron filter and then filtering with a 1.0 micron filter, and so on, as desired. In addition, the size of the modified pigment products in the inkjet inks is preferably no larger than about 2 microns. More preferably, the size of the modified pigment product is one micron or less.

Advantageously, the inkjet inks of the invention have excellent stability over time and a wide range of temperatures, have desirable viscosities and surface tensions, and when printer, have good optical density, print clarity, rub resistance, and waterfastness can be obtained when the inkjet ink contains certain stryenated acrylics that impart this property. For instance, one such stryenated acrylic has a molecular weight of about 4200, a polydispersibility of about 2, and acid number of about 215, a softening point of about 128° C., and a Tg of about 67° C. A commercially available example is JON-CRYL 58 acrylic (JONCRYL is a registered trademark of Johnson Polymer, Racine Wis.), which is a solution of Joncryl 680.

The present invention will be further clarified by the following examples, which are intended to be purely exemplary of the present invention.

EXAMPLE 1

Preparation of a Polymer

A 2 L three neck flask equipped with a mechanical stirrer, a pressure equalizing addition funnel and a thermometer was charged with 46.5 grams of 4-nitrobenzoyl chloride and 400 mL of toluene. After cooling the flask in an ice bath, a solution of 27.9 grams of triethyl amine and 250 grams of polypropylene glycol monobutyl ether (MW 1000) in 100 mL of toluene was added through the addition funnel so the temperature was kept below 25° C. After the addition was complete, the addition funnel was replaced with a condenser having a drying tube and the flask was heated at reflux for five hours with a heating mantle. The mixture was then cooled, and the solids were removed by filtration. The solvent was removed from the supernatant, and the residue was dissolved in chloroform. The resulting solution was washed twice with a 5% $K_2CO_3$ solution and then with a 5% NaCl solution and concentrated under vacuum. The residue was dissolved in about 2 L of ethanol and hydrogenated at about one atmosphere of hydrogen using 10 grams of a 5% Pd/C catalyst. The solvent was removed under vacuum. NMR analysis confirmed that the product was $H_2C_6H_4CO_2(CH(CH_3)CH_2O)_xC_4H_9$.

EXAMPLE 2

Preparation of a Carbon Product

An eight inch pelletizer was charged with 31.5 grams of sulfanilic acid and 600 grams of a carbon black with a surface area of 200 $m^2/g$ and a DBPA of 117 mL/100 g. After mixing for a few minutes, a solution of 6.2 g of $NaNO_2$ in 600 g of water was added. Mixing was continued for about ten minutes, and the product was removed and dried in an oven at 70° C. A sulfur analysis of a sample of the product that had been subjected to Soxhlet extraction with methanol indicated that 0.22 mmol of $C_6H_4SO_3^-Na^+$ groups were attached to the carbon black.

EXAMPLE 3

Preparation of a Carbon Black Product Having a Chemically Attached Polymer and an Amphiphilic Salt Twenty grams of the carbon black product of Example 2 and 26.9 grams of the polymer of Example 1 and 2.3 grams of methane sulfonic acid were added to a mixture of 50 mL of water and 150 mL of 2-butanone. The resulting mixture was stirred while a solution of 1.65 grams of $NaNO_2$ in a few mL of water was added. After stirring for one hour at room temperature, the mixture was heated to 60° C. and the stirring was continued for an additional hour. A mixture of 7.5 grams of 4-$CH_3CH(NH_2)C_6H_4(OCH_2CH(CH_3))_{30}OH$ (available from Triquest) 0.38 grams of methane sulfonic acid, 40 grams of water and 40 grams of 2-butanone was added and the resulting mixture was stirred for an additional hour. The mixture was cooled to room temperature, the aqueous layer was removed and the solvent was allowed to evaporate from the remaining dispersion. About 200 mL of ethanol was added, and the resulting dispersion was purified using about 3 volumes of ethanol in a diafiltration device. The product was recovered after removal of the solvent. The product has a chemically attached polymer and an amphiphilic salt of the $C_6H_4SO_3^-$ group. On shaking the product with 2-butanone, a stable dispersion was formed with a mean volume particle size of 0.18 microns. After storage at 60° C. for four days in 2-butanone, the particle size was 0.19 microns.

EXAMPLE 4

Preparation of a Carbon Black Product Having a Chemically Attached Polymer and an Amphiphilic Salt Forty grams of the carbon black product of Example 2 and 53.7 grams of the polymer of Example 1 and 4.6 grams of methane sulfonic acid were added to a mixture of 100 mL of water and 300 mL of 2-butanone. The resulting mixture was stirred while a solution of 3.3 grams of $NaNO_2$ in a few mL of water was added dropwise. After stirring for one hour at room temperature, the mixture was heated to 60° C. and the stirring was continued for an additional hour. The mixture was divided into two parts, and a mixture of 2.4 grams of $CH_3CH(NH_2)CH_2O(CH(CH_3)CH_2O)_8C_2H_4OCH_3$, 0.38 grams of methane sulfonic acid, 20 grams of water was added and the resulting mixture was stirred for an additional hour. The mixture was cooled to room temperature, and the solvent was allowed to evaporate. About 500 mL of water was added and the mixture was filtered. The resulting solid was added to about 200 mL of ethanol, and the resulting dispersion was purified using about 4 volumes of ethanol in a diafiltration device. The product was recovered after removal of the solvent. The product has a chemically attached polymer and an amphiphilic salt of the $C_6H_4SO_3$— group. On shaking the product with 2-butanone, a stable dispersion is formed.

EXAMPLE 5

Preparation of a Polymer

A 2 L three neck flask equipped with a mechanical stirrer, a pressure equalizing addition funnel and a thermometer was charged with 92.9 grams of 4-nitrobenzoyl chloride and 800 mL of toluene. After cooling the flask in an ice bath, a solution of 55.7 grams of triethyl amine and 103 grams of polypropylene glycol monobutyl ether (MW 340) in 100 mL of toluene was added through the addition funnel so the temperature was kept below 25° C. After the addition was complete, the addition funnel was replaced with a condenser having a drying tube and the flask was heated at reflux for five hours with a heating mantle. The mixture was then cooled, and the solids were removed by filtration. The solvent was removed from the supernatant, and the residue was dissolved in chloroform. The resulting solution was washed with an aqueous 5% $K_2CO_3$ solution until the washings were basic and then with an aqueous 5% NaCl solution. After concentration under vacuum, the residue was dissolved in about 2 L of ethanol and hydrogenated at about one atmosphere of hydrogen using 10 grams of a 5% Pd/C catalyst. The solvent was removed under vacuum. NMR analysis confirmed that the product was $H_2NC_6H_4CO_2(CH(CH_3)CH_2O)_xC_4H_9$.

EXAMPLE 6

Preparation of a Carbon Black Product Having a Chemically Attached Polymer and an Amphiphilic Salt Forty grams of the carbon black product of Example 2 and 22.0 grams of the polymer of Example 5 and 4.6 grams of methane sulfonic acid were added to a mixture of 100 mL of water and 300 mL of 2-butanone. The resulting mixture was stirred while a solution of 3.3 grams of NaNO2 in a few mL of water was added dropwise. After stirring for one hour at room temperature, the mixture was heated to 60° C. and the stirring was continued for an additional hour. The mixture was divided into two parts, and a mixture of 7.5 grams of 4-$CH_3CH(NH_2)C_6H_4(OCH_2CH(CH_3))_{30}OH$ (available from Triquest), 0.38 grams of methane sulfonic acid, 40 grams of water was added and the resulting mixture was stirred for an additional hour. The mixture was cooled to room temperature, and the solvent was allowed to evaporate. About 500 mL of water was added (??) and the mixture was filtered. The resulting solid was added to about 200 mL of ethanol, and the resulting dispersion was purified using about 4 volumes of ethanol in a diafiltration device. The product was recovered after removal of the solvent. The product has a chemically attached polymer and an amphiphilic salt of the $C_6H_4SO_3^-$ group.

Other embodiments of the present invention will be apparent to those skilled in the art from consideration of the specification and practice of the invention disclosed herein. It is intended that the specification and examples be considered as exemplary only, with a true scope and spirit of the present invention being indicated by the following claims.

What is claimed is:

1. A carbon black product having attached
a) at least one steric group having the formula —X—Sp—[$(CH_2)_m$—O—)]$_p$R or —X—Sp—[A]$_p$R, wherein
X is attached to the pigment and is an arylene group or alkylene group;
Sp represents a spacer group and is a bond or a chemical group selected from the group consisting of: $CO_2$, $O_2C$, $SO_2$, CO, NHCO, CONR", NR"$CO_2$, OCNR", NR"CONR", O, S, NR", $SO_2C_2H_4$, arylene, alkylene, NR"CO, NHCO$_2$, O$_2$CNH, and NCHONH, wherein R", which can be the same or different, represents an aryl or alkyl group;

m is an integer of from 1 to 12;
p is an integer from 1 to 500;
A represents an alkylene oxide group of from about 1 to about 12 carbons, wherein A can be the same or different when p is greater than 1; and
R is hydrogen, a branched or unbranched C1-C12 alkyl group, or an aromatic group; and
b) at least one aromatic or C1-C12 alkyl group further substituted with at least one —COO$^-$, —SO$_3^-$, —HPO$_3^-$, or —PO$_3^{-2}$ group with at least one amphiphilic counterion.

2. A carbon black product having attached
a) at least one steric group having the formula —X—Sp-[polymer]R, wherein
X is attached to the pigment and is an arylene group or alkylene group;
Sp represents a spacer group and is a bond or a chemical group selected from the group consisting of: $CO_2$, $O_2C$, SO, CO, NHCO, CONR", NR"$CO_2$, OCNR", NR"CONR", O, S, NR", $SO_2C_2H_4$, arylene, alkylene, NR"CO, NHCO$_2$, O$_2$CNH, and NCHONH, wherein R", which can be the same or different, represents an aryl or alkyl group
"polymer" represents a polyolefin group, a polyurethane group, a polystyrenic group, a polyacrylate group, a polyamide group, a polyester group, or mixtures thereof, optionally having at least one —X' group, wherein X' is an aromatic group, arylene group, alkyl group, or alkylene group, each X' and X can be the same or different; and the total amount of monomer groups of "polymer" is not greater than about 500 monomer repeating units;
R is hydrogen, a bond, a branched or unbranched C1-C12 alkyl group, or an aromatic group and when R represents a bond, R optionally bonds to said pigment; and
b) at least one aromatic or C1-C12 alkyl group further substituted with at least one —COO$^-$, —SO$_3^-$, —HPO$_3^-$, or PO$_3^{-2}$ group with at least one amphiphilic counterion.

3. The pigment product of claim 1, wherein said steric group has the formula:

—X—Sp—[$(CH_2)_m$—O—)]$_p$R.

4. The pigment product of claim 1, wherein said steric group has the formula:

—X—Sp—[A]$_p$R.

5. The pigment product of claim 4, wherein X is an aromatic group.

6. The pigment product of claim 4, wherein X is substituted with a carboxylic group or a sulfonate group.

7. The pigment product of claim 4, wherein p is from 1 to 25.

8. The pigment product of claim 4, wherein p is from 26 to 50.

9. The pigment product of claim 4, wherein R is an aromatic group.

10. The pigment product of claim 4, wherein m is 2, p is 44-45, R is a methyl group, and X is a benzoyl group.

11. The pigment product of claim 4, wherein m is 2, p is 22, R is a methyl group, and X is a benzoyl group.

12. The pigment product of claim 4, wherein m is 2, p is 44-45, R is hydrogen, and X is a benzoyl group.

13. The pigment product of claim 4, wherein m is 2, p is 7, R is a methyl group, and X is a benzoyl group.

14. An ink composition comprising a) at least one liquid vehicle; b) at least one pigment product of claim 1.

15. The ink composition of claim 14, wherein said liquid vehicle is aqueous.

16. The ink composition of claim 14, wherein said liquid vehicle is non-aqueous.

17. The ink composition of claim 14, wherein said ink composition is an inkjet ink composition.

18. The ink composition of claim 14, further comprising at least one humectant, at least one binder, at least one dye, at least one biocide, at least one penetrant, at least one surfactant, or combinations thereof.

19. A printing plate comprising: a substrate, a protective layer located onto said substrate, and au infrared or near-infrared radiation-absorptive layer located on said protective layer, wherein said radiation-absorptive layer comprises at least one pigment of claim 1.

20. An ink composition comprising a) at least one liquid vehicle; b) at least one pigment product of claim 2.

21. The ink composition of claim 20, wherein said liquid vehicle is aqueous.

22. The ink composition of claim 20, wherein said liquid vehicle is non-aqueous.

23. The ink composition of claim 20, wherein said ink composition is an inkjet ink composition.

24. The ink composition of claim 20, further comprising at least one humectant, at least one binder, at least one dye, at least one biocide, at least one penetrant, at least one surfactant, or combinations thereof.

25. A printing plate comprising: a substrate, a protective layer located onto said substrate, and an infrared or near-infrared radiation-absorptive layer located on said protective layer, wherein said radiation-absorptive layer comprises at least one pigment of claim 2.

* * * * *

UNITED STATES PATENT AND TRADEMARK OFFICE
CERTIFICATE OF CORRECTION

PATENT NO. : 7,544,238 B1 Page 1 of 1
APPLICATION NO. : 09/672328
DATED : June 9, 2009
INVENTOR(S) : Belmont It is certified that error appears in the above-identified patent and that said Letters Patent is hereby corrected as shown below:

At column 21, line 51, the formula "$H_2C_6H_4CO_2(CH(CH_3)CH_2O)_xC_4H_9$" should be replaced with --$H_2NC_6H_4CO_2(CH(CH_3)CH_2O)_xC_4H_9$--

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,544,238 B1 | Page 1 of 1 |
| APPLICATION NO. | : 09/672328 | |
| DATED | : June 9, 2009 | |
| INVENTOR(S) | : Belmont | |

It is certified that error appears in the above-identified patent and that said Letters Patent is hereby corrected as shown below:

At column 23, line 59, the word "pigment" should be replaced with --carbon black product--

At column 24, line 15, the word "pigment" should be replaced with --carbon black product--

At column 24, line 34, the word "pigment" should be replaced with --carbon black product--

At column 24, line 39, the word "pigment" should be replaced with --carbon black--

At column 24, line 44, the word "pigment" should be replaced with --carbon black--

At column 24, line 47, the word "pigment" should be replaced with --carbon black--

At column 24, line 49, the word "pigment" should be replaced with --carbon black--

At column 24, line 51, the word "pigment" should be replaced with --carbon black--

At column 24, line 53, the word "pigment" should be replaced with --carbon black--

At column 24, line 55, the word "pigment" should be replaced with --carbon black--

At column 24, line 57, the word "pigment" should be replaced with --carbon black--

At column 24, line 59, the word "pigment" should be replaced with --carbon black--

At column 24, line 61, the word "pigment" should be replaced with --carbon black--

At column 24, line 63, the word "pigment" should be replaced with --carbon black--

At column 24, line 66, the word "pigment" should be replaced with --carbon black--

At column 25, line 15, the word "pigment" should be replaced with --carbon black product--

At column 25, line 17, the word "pigment" should be replaced with --carbon black--

At column 26, line 15, the word "pigment" should be replaced with --carbon black product--

Signed and Sealed this
Twelfth Day of July, 2011

David J. Kappos
*Director of the United States Patent and Trademark Office*